R. W. LEEMING.
RESILIENT WHEEL.
APPLICATION FILED JUNE 17, 1916.
1,208,588. Patented Dec. 12, 1916.
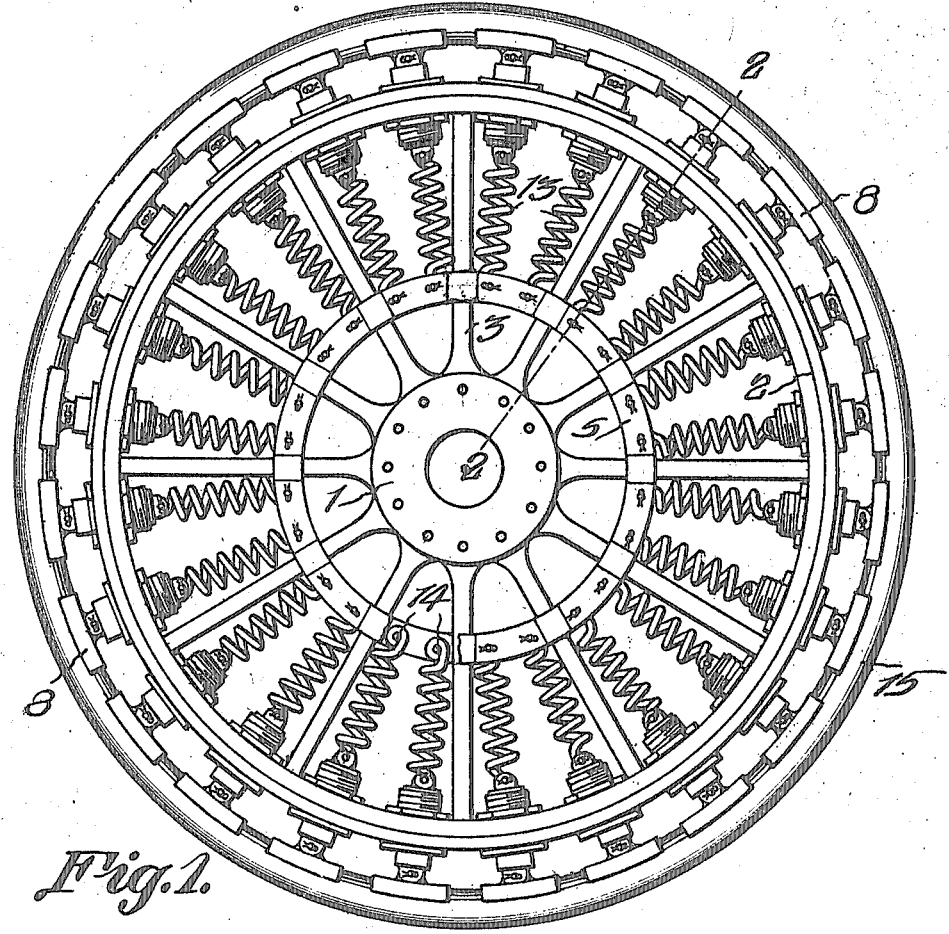
Fig. 1.
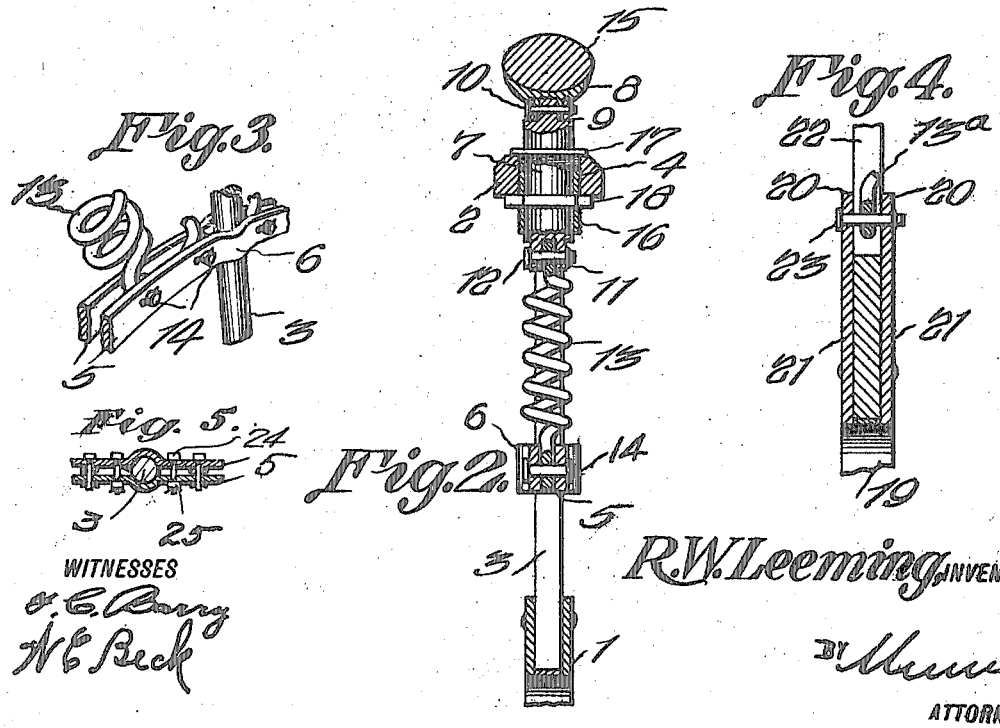
WITNESSES
R. W. Leeming, INVENTOR
ATTORNEYS

UNITED STATES PATENT OFFICE.

ROBERT WILLIAM LEEMING, OF BRANTFORD, ONTARIO, CANADA.

RESILIENT WHEEL.

1,208,588.  Specification of Letters Patent.  Patented Dec. 12, 1916.

Application filed June 17, 1916. Serial No. 104,225.

*To all whom it may concern:*

Be it known that I, ROBERT W. LEEMING, a subject of the King of Great Britain, and a resident of Brantford, Province of Ontario, in the Dominion of Canada, have invented a new and useful Improvement in Resilient Wheels, of which the following is a specification.

My invention is an improvement in resilient wheels for automobiles and like vehicles, and has for its object to provide a wheel having a yieldable tread which will provide the resiliency of a pneumatic tire without the disadvantages thereof and without complexity of parts and without excessive expense.

In the drawings: Figure 1 is a side view of the improved wheel, Fig. 2 is a section on the line 2—2 of Fig. 1, Fig. 3 is a perspective view of a portion of the spring engaging ring, and Fig. 4 is a sectional view showing a modified construction. Fig. 5 is a sectional view showing the manner of clamping the spring engaging ring on the wheel.

In the present embodiment of the invention the wheel comprises a hub 1 and a rim 2 connected by spokes 3 in the usual manner, and the rim is provided at spaced intervals with radial openings 4. A ring is connected with the spokes between the hub and the rim, the said ring comprising oppositely arranged sections 5, which have grooves or outwardly offset portions 6 at the spokes 3. These grooves or outwardly offset portions 6 receive the spokes, and the rings are held together by mechanism to be later described. A plunger 7 is arranged within each of the radial openings, each plunger having at its outer end and pivotally connected therewith a tire supporting shoe 8. These shoes 8 have spaced lugs 9 which are received within recesses in the outer ends of the plungers, and bolts 10 are passed through registering openings in the lugs and in the end of the plunger, and are engaged by cotter pins as shown.

Each plunger is provided at its inner end with a pair of spaced lugs 11, and a coil spring 13 is arranged between each plunger and the ring 5—5. Each of these springs as shown is provided at its ends with eyes, one being received between the lugs 11 of the plunger and engaging the bolt 12, the other eye engaging a bolt 14, connecting the sections 5 of the ring.

In the present instance a pair of springs 13 is arranged between each pair of adjacent spokes and as a consequence there are two bolts 14 between each pair of adjacent spokes. Each bolt 14 is engaged by a cotter pin as shown to prevent disengagement thereof, and the bolts assist in clamping the ring sections on the spokes. Preferably the ring sections are bolted or riveted together at the spokes as shown.

A solid tire 15 is supported by the shoes, and the shoes are of such length and the springs 13 so arranged that the ends of the shoes will be spaced apart from each other as shown in Fig. 1. The springs 13 are neutral when the wheel is inoperative, that is, they are neither under tension nor compression. For this reason when the outer tire is mounted and the springs are set in position it is obvious that the outer tire will without any further adjustment, be brought into concentric relation with the wheel.

When the wheel is acted upon by the weight of the vehicle or by shock or pressure it will be evident that the tendency toward a deformation of the wheel, that is, the tendency to cause the tire to take a position eccentric to the wheel, will be resisted by springs, and when deformed the springs will act to restore the concentricity of the parts. Furthermore the flexibility of the tire has not been destroyed by a rigid mounting, not being supported by an inflexible rim or channel.

In the present construction the mounting of the tire leaves free and unimpaired the flexibility thereof, and use of this flexibility is made to prevent the binding of the plungers.

The operation is as follows: As the inner wheel springs downward under varying pressure on the axle the plungers at the front and rear carry down with them the outer tire at these points. At the same time the springs capable of both expansion and contraction draw upon the upper half circle of the tire which by this joint action is drawn downward evenly with the solid inner rim. The lower half circle of the tire from the tread upward is slightly compressed and tends to take an elliptical form. This tendency however is counteracted and kept within narrow limits by the inward pull of the springs and so controlled it causes no practical difficulty. A bushing is arranged in each of the radial openings 4, in which the plunger moves. Each of the bushings 16 is externally threaded and is provided at its outer end with a marginal flange 17, which engages the outer or peripheral surface of the rim. A nut 18 is threaded on to each bushing inside the rim, the rim being clamped between the nuts and the flanges 17. It will be noticed from an inspection of Figs. 1 and 2 that each bushing is of a length to extend well within the rim, and practically the full length of that portion of the plunger which is within the rim. The coil springs 13 act to resist movement of the plungers in either direction and when the wheel is in a state of equilibrium the springs are neutral, being neither under tension or under compression.

The embodiment of the invention shown in Figs. 1 to 3, wherein the ring consists of sections which are clamped upon the spokes is especially adapted for existing wheels. It is obvious however, that the inner ends of the springs might be attached directly to the hub without the intervention of the ring 5—5.

In Fig. 4 is shown a construction of this character. In this arrangement the hub 19 of the wheel has extensions 20 from the facing plates 21 thereof between the spokes 22, and the said extensions have openings through which are passed the bolts 23 corresponding to the bolts 14 of Figs. 1 to 3. The springs 13$^a$ are connected with the bolts 23, and the said bolts are held in place by cotter pins as shown. In this instance instead of providing the section ring 5—5 the inner ends of the springs 13$^a$ are connected directly with the wheel.

In Fig. 5 is shown a method of clamping the ring sections 5 on the spokes 3. A bolt 24 is passed through the rings at each side of each spoke, each bolt being engaged by a nut 25, and it will be evident that by means of the nuts the ring sections may be tightly clamped on the spokes.

The shoes are securely fastened to the tire in any preferred manner.

I claim:—

In combination, a wheel having radial openings in its rim, and a ring clamped to the spokes coaxial with the wheel, a plunger slidable in each opening, a tire supporting shoe pivoted to each plunger outside of the rim, a solid flexible tire held by the shoe, and a spring between the inner end of each plunger and the ring and connecting the plunger to the ring, all of the said springs being normally neutral, neither under compression nor expansion.

ROBERT WILLIAM LEEMING.

Witnesses:
ALEXANDER E. ROSS,
CHARLES AUSTIN.